Oct. 31, 1967 M. C. MERELIS 3,349,413
BRACE FOR INFANT'S CAR BED
Filed May 20, 1966
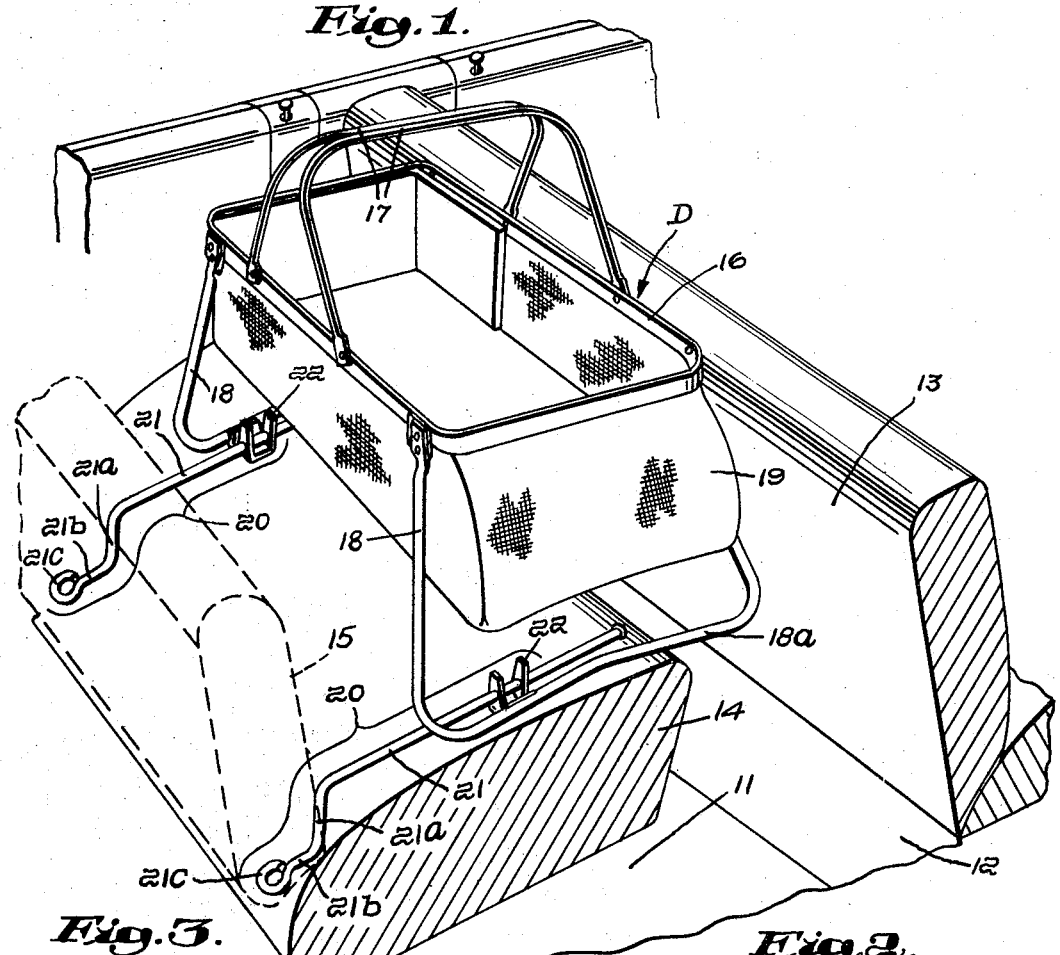
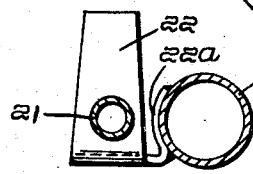
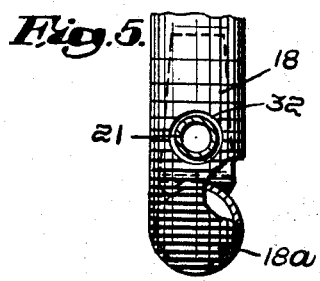
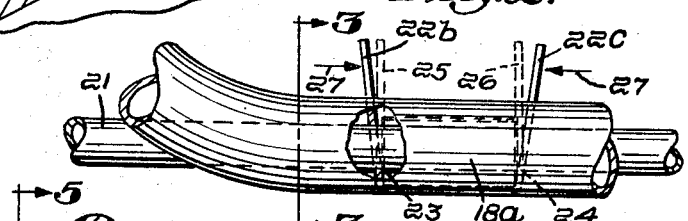
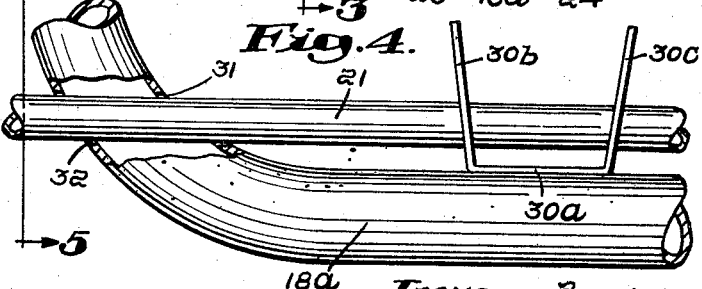
Inventor:
Morris C. Merelis,
by Thomson & Thross Attorneys

United States Patent Office 3,349,413
Patented Oct. 31, 1967

3,349,413
BRACE FOR INFANT'S CAR BED
Morris C. Merelis, Brookline, Mass., assignor to Rose-Derry Company, Newton, Mass., a corporation of Massachusetts
Filed May 20, 1966, Ser. No. 551,687
3 Claims. (Cl. 5—94)

ABSTRACT OF THE DISCLOSURE

A brace adapted to secure an infant's car bed on the rear seat of an automobile. A pair of rods are slidably attached to the frame of the bed having bent down rear end portions terminating in loops which can be inserted under the bottom of the back cushion of the rear seat. The rods are slid out to jam the bed against the back of the front seat and are releasably locked by clamps on the bed frame.

This invention relates to infant's car beds, and more particularly to a brace for securing a car bed on the seat of an automobile.

Car beds of the type to which this invention pertains consits generally of a rectangular metal top frame, supported on legs and usually also provided with handles for carying, and a rectangular cloth bassinet suspended from the frame. Such beds are customarily made so that they can be folded flat for storage.

The principal object of this invention is to provide a brace by which a bed of the type just described can be easily and securely mounted on the rear seat of an automobile. Other objects, advantages, and novel features will be apparent from the following description.

The brace consists in general of a rod mounted to slide horizontally in a bracket attached to one of the legs of the bed, and releasably locked in position by a clamp. The rod has a hooked end portion which can be jammed between the back cushion and the seat cushion of an automobile rear seat. The rod is slid into a position in which the opposite side of the bed is pressed against the back of the front seat, and is locked by the clamp. Two such braces are used on a bed.

In the drawings illustrating the invention:

FIG. 1 is a perspective view of an infant's car bed mounted on the rear seat of an automobile by means of a pair of braces constructed according to the preferred form of invention;

FIG. 2 is an enlarged fragmentary side view taken in the region of one of the clamps;

FIG. 3 is a cross-section taken along line 3—3 of FIG. 2;

FIG. 4 is an enlarged fragmentary side view taken in the region of one of the clamps, illustrating a modified form of the invention; and FIG. 5 is a view taken along line 5—5 of FIG. 4.

The car bed, generally indicated by the numeral 10, is shown mounted on the back seat 11 of an automobile, which also has a front seat 12 with a back cushion 13. The red rests on the seat cushion 14 of the back seat. The position of the back cushion of the back seat is indicated by the dotted outline 15.

The bed has a rectangular metal top frame 16, to which are attached a pair of handles 17 and a pair of U-shaped legs 18, made of metal tubing having flat transverse bottom portions 18a. A cloth bassinet 19 is suspended from the top frame. The bed is secured by a pair of braces 20, one attached to portion 18a of each leg.

Each brace consists of a rod 21 and a U-shaped clamp 22 having a side extension 22a which is welded to the adjacent leg portion 18a. The clamp has upstanding legs 22b and 22c, and is made of spring steel. The legs have holes 23 and 24 through which rod 21 passes. The legs are braced so that they normally lie in oblique position and exert locking pressure on rod 21. When the legs are in an upright position, as indicated by the dotted outlines 25 and 26 in FIG. 2, so that the holes are axially aligned with rod 21, the rod can slide freely. The rod may thus be released by pressing legs 22b and 22c toward each other in the direction of arrows 27.

Rod 21 has a downwardly sloping portion 21a leading to an offset portion 21b at the rear, terminating in a coiled portion 21c. To secure the bed on the back seat of an automobile, portions 21b and 21c are pushed down between the back cushion 15 and seat cushion 14 until they engage under the bottom of the back cushion. The clamps 22 are loosened and the rods are slid sidewise to such a position that the forward side of the bed engages the back of back cushion 13 of the front seat. The bed is thus firmly secured.

In the modification shown in FIGS. 4 and 5, a U-shaped clamp 30 has a bottom portion 30a which is welded to the top of leg portion 18a, and upstanding legs 30b and 30c. The legs have holes through which rod 21 passes and act as releasable clamps on the rod in the same manner as legs 22b and 22c in the form of clamp previously described. Rod 21 passes slidably through holes 31 and 32 in the upturned rear portion of leg 18. The brace is used in the same manner as the form previously described.

When the bed is to be folded for storage the braces, which are about the same length as the flat bottom portions of the legs, can be slid in to lie alongside the legs. The legs are then folded toward each other in the usual manner, and the braces do not add materially to the bulk or weight of the folded assembly.

The brace here shown can be constructed inexpensively from the same type of metal tubing as that used for the legs of a typical car bed, and provides a safe and convenient means for mounting the bed on an automobile seat.

What is claimed is:

1. A brace, for an infant's car bed of the type having a frame and a supporting leg with a transverse bottom portion, comprising a rod disposed adjacent and substantially parallel to said transverse portion and clamping means connecting said rod to said portion, said clamping means being releasable to permit transverse sliding of said rod, said rod having a downwardly extending portion and a flat loop portion extending rearwardly therefrom, said rod being slidable to an extended position in which said bed is supported on the rear seat of a car with said downwardly extending portion pressing against the front of the back cushion of the rear seat, said loop portion under the back cushion, and said bed braced against the back of the front seat.

2. A brace as described in claim 1, said clamping means comprising a U-shaped spring clamp having a sidewardly extending bracket attached to said transverse portion and upwardly extending legs, said legs having holes through which said rod passes and being bendable between a position in which said rod passes freely through said holes and a position in which said legs exert clamping action on said rod.

3. A brace as described in claim 1, said leg having an upturned portion provided with an opening through which said rod passes, and said clamping device comprising a U-shaped spring clamp having a bottom portion attached to said transverse portion and upwardly extending legs, said legs having holes through which said rod passes and being bendable between a position in which said rod passes freely through said holes and a position in which said legs exert clamping action on said rod.

References Cited

UNITED STATES PATENTS

| | | | |
|---|---|---|---|
| 2,276,857 | 3/1942 | Muller | 297—253 |
| 2,617,119 | 11/1952 | Linder | 5—94 |
| 2,791,269 | 5/1957 | Buell et al. | 5—94 |
| 3,212,817 | 10/1965 | Sully | 297—433 X |
| 3,214,122 | 10/1965 | Frederickson | 248—410 X |
| 3,233,297 | 2/1966 | Havener | 248—410 X |
| 3,262,736 | 7/1966 | Merelis | 297—253 |

CASMIR A. NUNBERG, *Primary Examiner.*